United States Patent
Mujica et al.

(10) Patent No.: US 8,306,150 B2
(45) Date of Patent: Nov. 6, 2012

(54) SYSTEM AND METHOD FOR ESTIMATING A TRANSMIT CHANNEL RESPONSE AND/OR A FEEDBACK CHANNEL RESPONSE USING FREQUENCY SHIFTING

(75) Inventors: Fernando A. Mujica, Allen, TX (US); Carson A. Wick, Atlanta, GA (US); Lei Ding, Plano, TX (US); Milind Borkar, Dallas, TX (US); Roland Sperlich, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 264 days.

(21) Appl. No.: 12/823,714

(22) Filed: Jun. 25, 2010

(65) Prior Publication Data

US 2011/0317786 A1    Dec. 29, 2011

(51) Int. Cl.
*H04K 1/02* (2006.01)
*H04L 25/03* (2006.01)
*H04L 25/49* (2006.01)

(52) U.S. Cl. ........ 375/296; 375/297; 375/285; 375/231; 375/232; 455/114.2; 455/114.3

(58) Field of Classification Search .................. 375/296, 375/297, 221, 229–232, 285; 455/114.2, 455/114.3
See application file for complete search history.

(56) References Cited

U.S. PATENT DOCUMENTS

| 7,796,959 B2 * | 9/2010 | Heinikoski et al. ........ 455/114.2 |
| 2008/0089286 A1 | 4/2008 | Malladi et al. |

\* cited by examiner

*Primary Examiner* — Phuong Phu
(74) *Attorney, Agent, or Firm* — Steven A. Shaw; W. James Brady; Frederick J. Telecky, Jr.

(57) ABSTRACT

Systems and methods for identifying a transmission channel response and a feedback channel response from a plurality of composite system responses are disclosed. A plurality of shifted feedback signals are created by shifting a feedback signal frequency by a plurality of first offset values and/or by shifting a transmission signal frequency by a plurality of second offset values. The feedback signals are compared to an input signal to identify the transmission channel response and/or a feedback channel response. A control signal is generated for a pre-distortion circuit to modify the input signal by an inverse of the transmission channel response. The composite system response is measured at a plurality of operating frequencies and at the plurality of offset values. The measurements are stored in a matrix and singular value decomposition is applied to the matrix of measurements to calculate the transmission channel response and feedback channel response.

28 Claims, 4 Drawing Sheets

SYSTEM AND METHOD FOR ESTIMATING A TRANSMIT CHANNEL RESPONSE AND/OR A FEEDBACK CHANNEL RESPONSE USING FREQUENCY SHIFTING

TECHNICAL FIELD

Embodiments of the invention are directed, in general, to identifying the individual responses of cascaded components given an overall channel response and, more specifically, to identifying and eliminating a feedback channel response from an overall system response by introducing a frequency shift to a feedback channel or to a transmission channel or to both channels.

BACKGROUND

Pre-distortion is used in transmission systems to compensate for the linear and nonlinear effects of the transmission channel upon the signals to be transmitted. An adaptation engine may generate an error correction signal for a pre-distortion circuit. The error correction signal causes the pre-distortion circuit to modify the input signal in a way that counteracts the transmission channel response. As a result, the system output signal should be equivalent to the input signal with some gain value applied without other modification. The adaptation engine must know the transmission channel response in order to generate the correct error correction signal. The transmission channel response can be measured using external monitoring equipment that inputs a known signal and analyzes the output after passing through the transmission channel. The use of such external measuring equipment is not practical when the system is in use outside a production or test environment.

An adaptation engine internal to the system can also be used to measure a transmission channel response. The adaptation engine receives both the system input signal and the system output signal and then compares the input and output signals to determine the transmission channel response. As a result, the adaptation engine can determine the transmission channel response for current operating conditions. However, in such systems, the system output signal is provided to the adaptation engine via a feedback channel. Because the output signal must be down-converted, mixed, filtered or otherwise modified in the feedback channel before being applied to the adaptation engine, the feedback channel introduces its own response to the output signal in addition to the transmission channel response. Accordingly, the adaptation engine generates an error correction signal designed to counteract both the transmission channel response and a feedback channel response. Only the transmission channel portion of the pre-distortion will have been neutralized when the signal reaches the system output. As a result, the output signal will still include the inverse of the feedback channel, which was unintentionally included in the error correction signal from the adaptation engine. The feedback channel response must be identified by the system and eliminated from the pre-distortion correction.

SUMMARY

Embodiments of the invention provide a system and method for removing feedback channel response from a pre-distortion circuit in real-time. The system learns the feedback channel response and transmit channel response on its own without requiring factory calibration. The feedback channel response is identified in one embodiment by shifting the frequency of a feedback signal, which allows it to be identified within the combined system response. Alternatively, the frequency of the transmit channel may be shifted so that the transmit channel response can be identified within the combined system response. In a further alternative, both the transmit and feedback channel frequencies are shifted by different amounts to calculate the transmit and feedback channel responses. The transmit and feedback responses are calculated at the same time using singular value decomposition (SVD).

In one embodiment, a plurality of shifted feedback signals are created by shifting a feedback signal frequency by a plurality of offset values. The feedback signals are modified by a transmission channel response and a feedback channel response. The plurality of shifted feedback signals are compared to an input signal to identify the transmission channel response and/or a feedback channel response. A control signal is generated for a pre-distortion circuit. The control signal causes the pre-distortion circuit to modify the input signal by an inverse of the transmission channel response. The plurality of offset values may be selected from integer multiples of $2\pi/N$, where N is a selected number of measurement points between $\pi$ and $-\pi$. The value of N may also correspond to a length of a Discrete Fourier Transform used to convert feedback signal measurements to the frequency domain. The shifted feedback signals are divided by the input signal to calculate a plurality of composite system responses, each of the composite system responses comprising the transmission channel response and the feedback channel response.

The composite system response is measured at a plurality of operating frequencies and at the plurality of offset values. The measurements are stored in a matrix and singular value decomposition is applied to the matrix of measurements to calculate the transmission channel response and the feedback channel response. A primary coordinate of the matrix may correspond to the transmission channel response, and a secondary coordinate of the matrix may correspond to the feedback channel response. The measurements may be taken using a plurality of offset values that are not evenly spaced.

In another embodiment, a system comprises a pre-distortion circuit coupled between a system input and a transmission channel output. A mixer is coupled between the transmission channel output and an adaptation circuit in a feedback channel. The mixer offsets a frequency of a feedback signal away from a frequency of an output signal. The adaptation circuit is coupled to the pre-distortion engine and receives an input signal from the system input and the feedback signal. The adaptation circuit compares the input signal to the feedback signal at a plurality of feedback signal frequency offsets to generate a plurality of composite responses for the system. The adaptation circuit compares measurements of the plurality of composite responses to identify a transmit channel response and/or a feedback channel response. The adaptation circuit generates an error correction signal for the pre-distortion circuit based upon the transmit channel response and/or a feedback channel response. The error correction signal causes the pre-distortion circuit to modify the input signal by an inverse of the transmit channel response.

The plurality of feedback signal frequency offsets may be selected from integer multiples of $2\pi/N$, where N is a selected number of measurement points between $\pi$ and $-\pi$. The value of N may correspond to a length of a Discrete Fourier Transform used to convert feedback signal measurements to the frequency domain.

In a further embodiment, a plurality of shifted signals are created by shifting a digital input signal by a plurality of offset values. The shifted signals are up-converted to create a plurality of transmission signals centered at a selected output frequency. The transmission signals are down-converted in a feedback circuit to create feedback signals. The feedback signals are modified by transmission channel responses at the plurality of offset values and a feedback channel response. The plurality of feedback signals are compared to an input signal to identify a transmission channel response and/or a feedback channel response. A control signal is generated for a pre-distortion circuit. The control signal causes the pre-distortion circuit to modify the input signal by an inverse of the transmission channel response and/or a feedback channel response. The shifted feedback signals are divided by the input signal to calculate a plurality of composite system responses. Each of the composite system responses comprises the transmission channel response and the feedback channel response.

The composite system response is measured at a plurality of operating frequencies and at the plurality of offset values. The measurements are stored in a matrix, and a singular value decomposition is applied to the matrix of measurements to calculate the transmission channel response and the feedback channel response. A primary coordinate of the matrix corresponds to the transmission channel response, and a secondary coordinate of the matrix corresponds to the feedback channel response. The measurements may be taken using a plurality of offset values that are not evenly spaced.

Another exemplary embodiment comprises system having a digital mixer coupled to a system input for receiving an input signal. The digital mixer creates a plurality of shifted input signals having an offset frequency. A local oscillator is coupled to a transmission channel mixer and to a feedback channel mixer. The local oscillator generates a local oscillator signal that is used in the transmission channel mixer to up-convert the plurality of shifted input signals to a plurality of output signals each at the same output frequency. The local oscillator signal is used in the feedback channel mixer to down-convert the plurality of output signals to feedback signals. An adaptation circuit receives the feedback signals and the input signal. The adaptation circuit compares the input signal to the feedback signals to generate a plurality of composite responses for the system, each of the composite responses corresponding to a different offset frequency. The adaptation circuit identifies a transmit channel response and/or a feedback channel response from the plurality of composite responses.

A pre-distortion circuit is coupled between the system input and the digital mixer. The adaptation circuit generates an error correction signal for the pre-distortion circuit based upon the transmit channel response. The error correction signal causes the pre-distortion circuit to modify the input signal by an inverse of the transmit channel response. The frequency of the local oscillator signal is selected by subtracting the offset frequency from a desired output signal frequency. The adaptation circuit measures the composite system response at a plurality of operating frequencies and at the offset frequencies, stores the measurements in a matrix, and by applying a singular value decomposition to the matrix of measurements to calculate the transmission channel response and/or a feedback channel response. A primary coordinate of the matrix corresponds to the transmission channel response, and a secondary coordinate of the matrix corresponds to a feedback channel response. The measurements may be taken using a plurality of offset frequencies that are not evenly spaced.

BRIEF DESCRIPTION OF THE DRAWINGS

Figure 1:
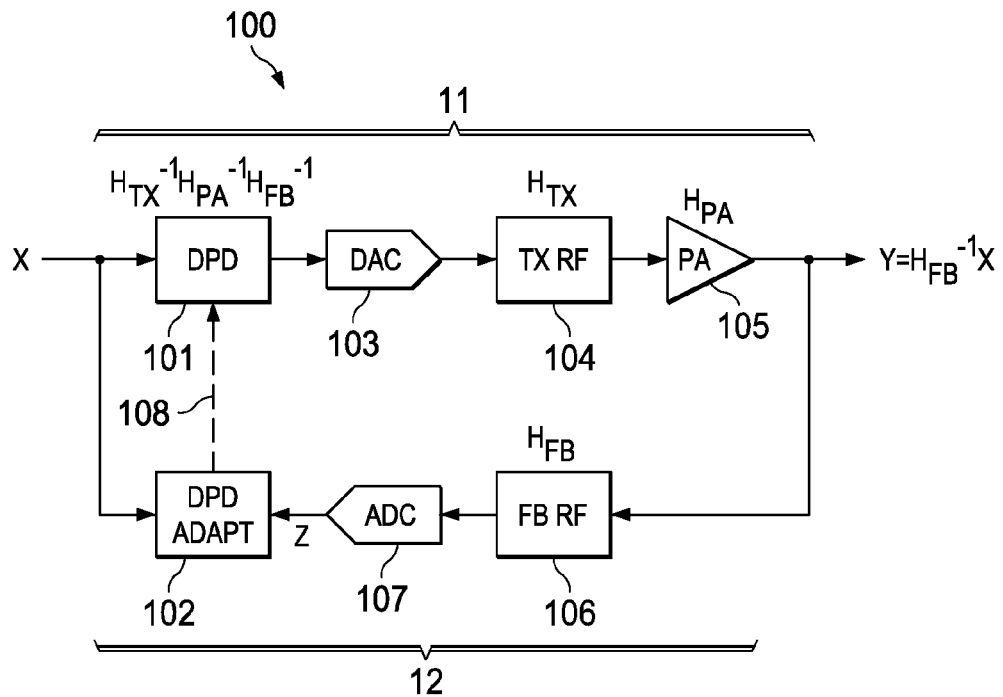
Figure 2:
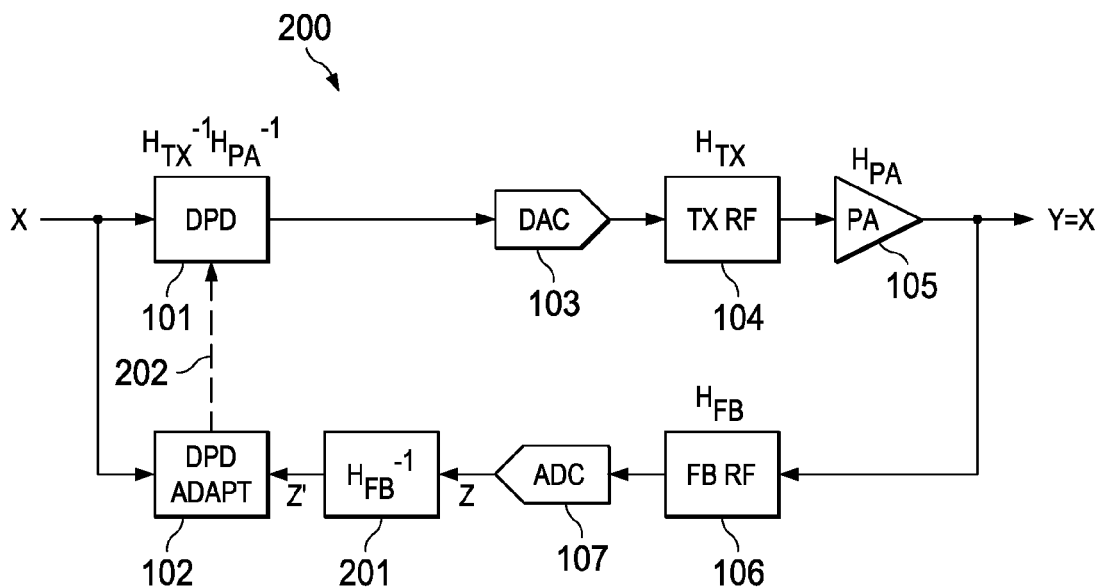
Figure 3:
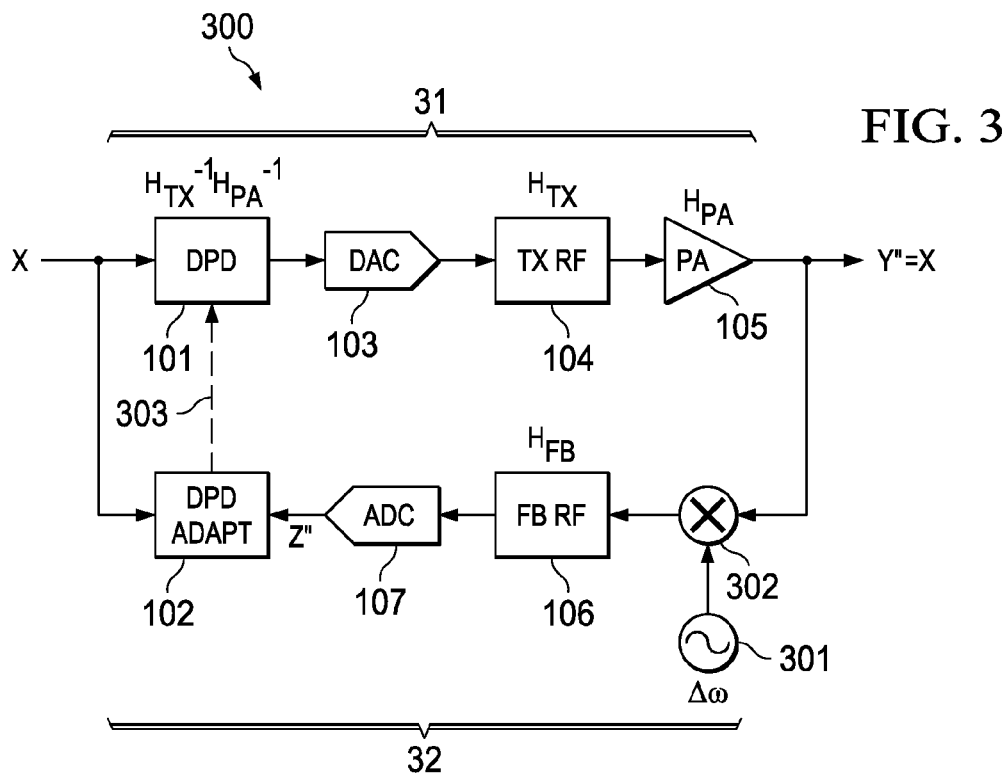
Figure 4:
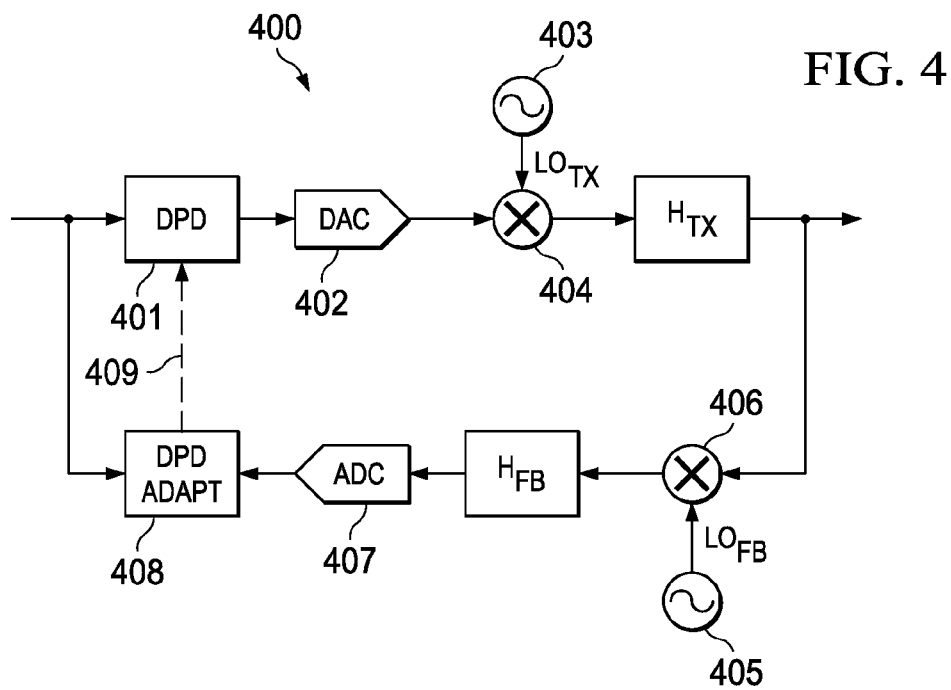
Figure 5A:
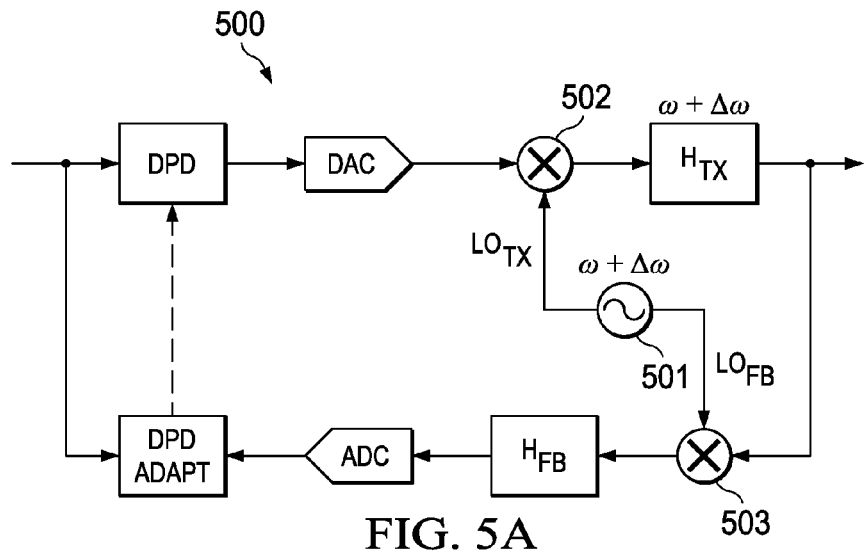
Figure 5B:
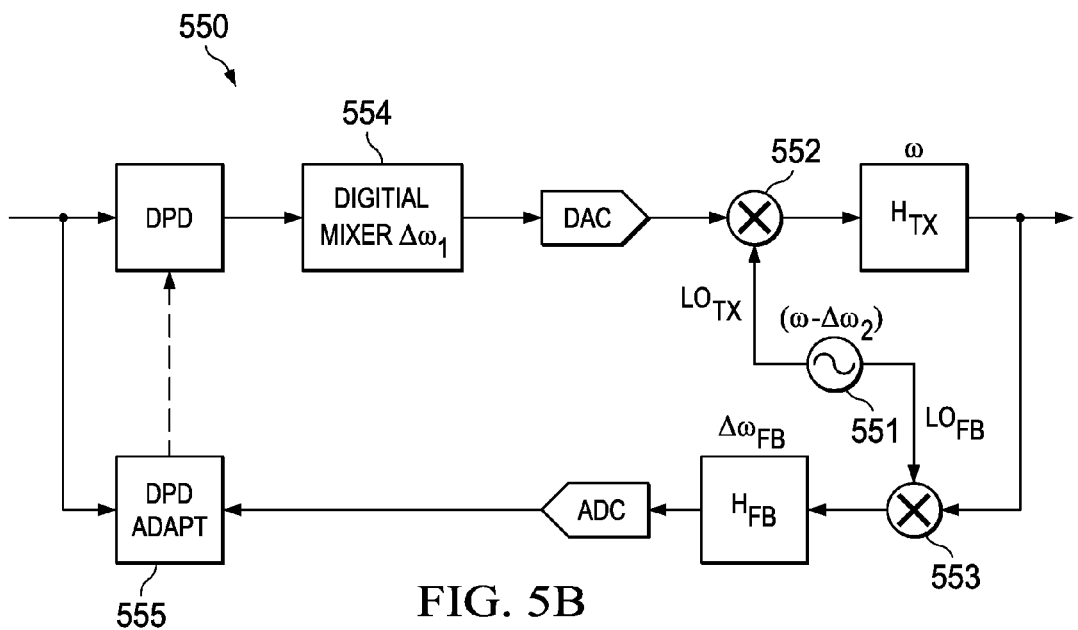
Figure 6:
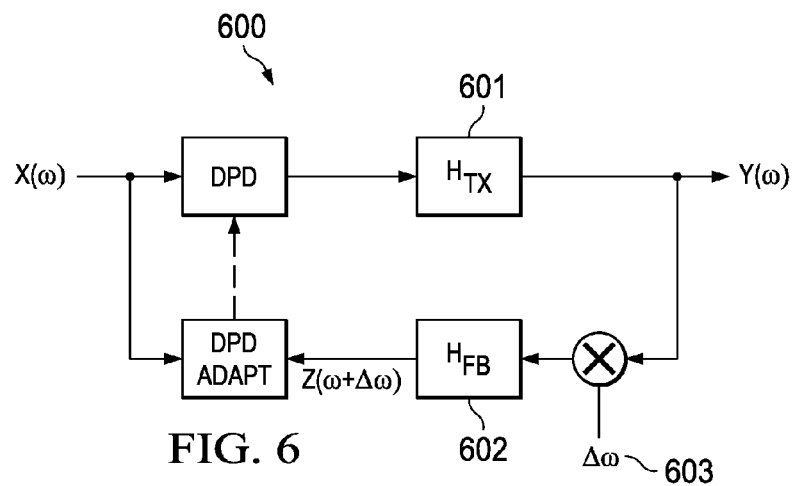
Figure 7:
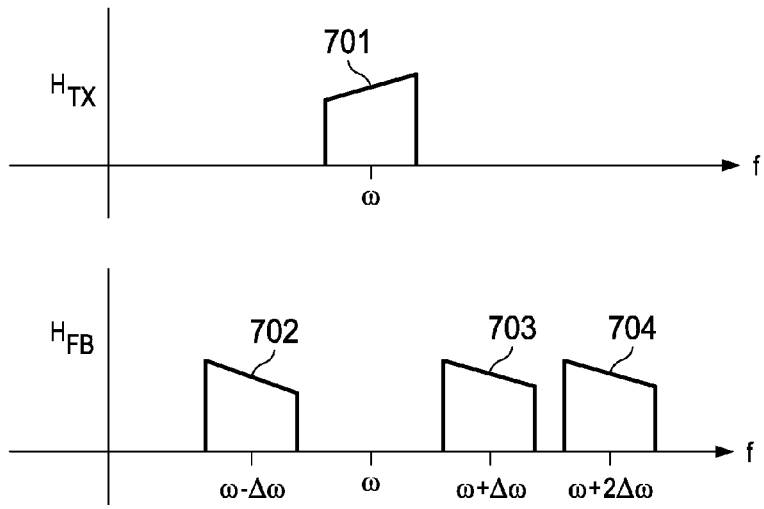
Figure 8A:
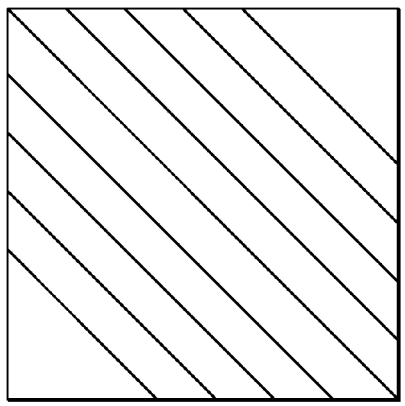
Figure 8B:
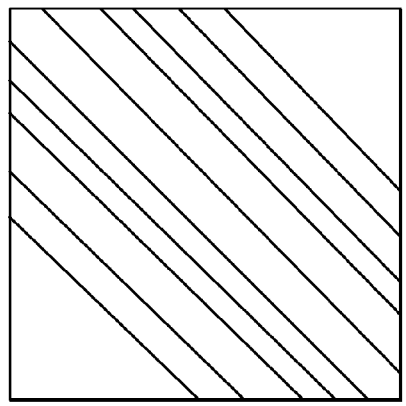

Having thus described the invention in general terms, reference will now be made to the accompanying drawings, wherein:

FIG. 1 is a block diagram of a digital RF system including a transmission path and a feedback channel;

FIG. 2 is a block diagram of a digital RF system that has been modified to remove feedback channel response ($H_{FB}$);

FIG. 3 is a block diagram of a system adapted for transmit channel and/or feedback channel response separation and identification;

FIG. 4 is a block diagram of a system adapted for identifying transmit and feedback channel responses using dual local oscillators;

FIG. 5A is a block diagram of a system adapted for transmit channel and/or feedback channel response separation and identification using a single local oscillator system;

FIG. 5B is a block diagram of a system adapted for transmit channel and/or feedback channel response separation and identification using a single local oscillator system;

FIG. 6 illustrates an equivalent model of a digital RF system including a transmission path and a feedback channel;

FIG. 7 illustrates a transmit channel transfer function $H_{TX}$ at operating frequency w and feedback channel transfer functions $H_{FB}$ at offset frequencies $\omega-\Delta\omega$, $\omega+\Delta\omega$, and $\omega+2\Delta\omega$;

FIG. 8A illustrates the location of uniformly spaced measurement data resulting from uniformly spaced offset values; and FIG. 8B illustrates the location of non-uniformly spaced measurement data resulting from non-uniformly spaced offset values.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram of a digital RF system 100 including a transmission path 11 and a feedback channel 12. Digital baseband signal (X), which is to be transmitted as an RF signal, is input to both digital pre-distortion (DPD) circuit 101 and DPD adaptation circuit (DPD Adapt) 102. After passing through DPD circuit 101, the digital baseband signal is then converted to an analog baseband signal in digital-to-analog converter (DAC) 103. The analog baseband signal is up-converted to the transmit frequency in TX RF circuit 104 and amplified in power amplifier (PA) 105. The output signal (Y) at PA 105 is fed to an antenna or other interface or circuit (not shown) for transmission. The system output is also routed to a feedback loop 12 where it is down-converted to an analog baseband signal in FB RF circuit 106. The analog baseband signal is then converted to digital baseband in analog-to-digital convertor (ADC) 107. The digital baseband output (Z) of ADC 107 is input to DPD Adapt 102, which compares the feedback signal Z to input signal X and generates error correction signal 108 for DPD 101.

The responses for TX RF circuit 104, PA 105, and FB RF circuit 106 are designated as $H_{TX}$, $H_{PA}$, and $H_{FB}$, respectively. Initially the DPD is a simple pass through system, and the feedback signal is equal to the input signal modified by these responses—e.g., $Z=H_{FB}H_{PA}H_{TX}X$. Because the feedback signal Z is actually used by DPD adaptation circuit 102 to generate an error correction signal, DPD 101 is adapting for all three responses—$H_{TX}$, $H_{PA}$ and $H_{FB}$. Accordingly, when signal Z is compared to input X in DPD Adapt 102, error correction signal 108 drives DPD 101 to apply inverse response ($H_{TX}^{-1}H_{PA}^{-1}H_{FB}^{-1}$). This means that DPD 101 mistakenly incorporates the feedback channel response ($H_{FB}$) into the inverse model. As a result, the system not only corrects for the non-idealities of the transmit channel (i.e., $H_{TX}$, $H_{PA}$), but also for non-idealities of the feedback channel ($H_{FB}$).

When input signal X passes through the transmit channel, only responses $H_{TX}$ and $H_{PA}$ are canceled out of signal Y before it is transmitted. Accordingly, in system 100, transmitted signal Y is the input signal X improperly modified by the feedback channel correction ($H_{FB}^{-1}$). This is troublesome because the desired transmit signal Y should be equal to the input signal X multiplied only by some linear gain and not further modified by some other response. It is important to note that system 100 appears to be working correctly from the viewpoint of DPD 101 because both inputs to DPD adaptation engine 102 are equal. This problem can be corrected by identifying the feedback channel response ($H_{FB}$) and then removing it from the feedback path before DPD adaptation engine 102.

FIG. 2 is a block diagram of a digital RF system 200 that has been modified to remove feedback channel response ($H_{FB}$). In system 200, the feedback channel is inverted ($H_{FB}^{-1}$) in feedback correction block 201 prior to being fed into DPD adaption engine 102. As a result, DPD 101 will only invert responses $H_{TX}$ and $H_{PA}$.

The same responses $H_{TX}$, $H_{PA}$, and $H_{FB}$ appear in the feedback signal Z in system 200 as system 100—(i.e. $Z=H_{FB}H_{PA}H_{TX}X$). When signal Z is passed through feedback correction block 201, it is modified by the inverse of the feedback channel ($H_{FB}^{-1}$). As a result, the output of feedback correction block 201 is $Z'=H_{FB}^{-1}H_{FB}H_{PA}H_{TX}X=H_{PA}H_{TX}X$. This feedback signal Z' is used by DPD adaptation in system 200 to generate error correction signal 202. Therefore, DPD 101 adapts based on transmit channel responses $H_{TX}$ and $H_{PA}$ only. Output signal Y in system 200 is equal to input X because DPD 101 does not incorporate the feedback channel response ($H_{FB}$) into the inverse model. Accordingly, system 200 only corrects for the non-idealities of the transmit channel (i.e., $H_{TX}$, $H_{PA}$). To achieve the advantages of system 200, the feedback channel response ($H_{FB}$) must be accurately identified and separated from the overall composite response at the output of ADC 107.

FIG. 3 illustrates a system 300 for feedback channel separation and identification. A frequency offset is introduced between the transmit channel 31 and feedback channel 32. Local oscillator (LO) 301 generates offset frequency $\Delta\omega$, which is combined with the feedback channel signal by mixer 302. By taking multiple measurements, each with a different frequency offset, at DPD adaptation engine 102, enough information can be obtained to accurately separate the feedback channel response from the overall composite response Z". DPD adaptation engine 102 can then apply the inverse of the frequency channel response ($H_{FB}^{-1}$) prior to computing error correction signal 303 for DPD 101. Assuming that $\omega$ is the frequency used for up-conversion in TX RF 104 and down-conversion in FB RF 106, then the composite response of system 300 at DPD adaptation engine 102 can be represented as $H(\omega, \Delta\omega)=H_{TX}(\omega)\cdot H_{PA}(\omega)\cdot H_{FB}(\omega+\Delta\omega)$.

A dual local oscillator system may be used to introduce the necessary frequency offset between the transmit and feedback channels. FIG. 4 is a schematic representation for a dual LO system 400. The input digital signal is first processed by pre-distortion device 401 and then converted to analog in DAC 402. The baseband analog signal is up-converted using $LO_{TX}$ from local oscillator 403 in mixer 404. FIG. 4 has been simplified by combining the response for the entire transmission channel, including the transmit RF components and power amplifier, into the forward channel response $H_{TX}$. The feedback signal is down-converted using $LO_{FB}$ from local oscillator 405 in mixer 406 and then digitized in ADC 407. DPD adaptation engine 408 compares the input signal and feedback signal and then generates error correction signal 409. In one embodiment of system 400, transmit local oscillator $LO_{TX}$ is held constant while feedback local oscillator $LO_{FB}$ is varied. The difference between these two local oscillator frequencies is the $\Delta\omega$ 301 shown in FIG. 3 (i.e. $\Delta\omega=LO_{TX}-LO_{FB}$). In an alternative embodiment of system 400, feedback local oscillator $LO_{FB}$ is held constant while transmit local oscillator $LO_{TX}$ is varied. In a more general system, either one or both $LO_{TX}$ and $LO_{FB}$ could be shifted separately or shifted at the same time by different amounts.

As an example, in system 400, multiple data points may be measured by keeping $LO_{TX}$ constant and varying $LO_{FB}$. These measurements are used to calculate the transmission and feedback channel responses using, for example, the process described below. In another embodiment, multiple data points are measured by keeping $LO_{FB}$ constant and varying $LO_{TX}$. These measurements are used to calculate the transmission and feedback channel responses. In another embodiment, multiple data points may be measured by varying both $LO_{TX}$ and $LO_{FB}$ by unequal amounts. These data points may be used to populate matrix C (Equation 6), which is then used to solve for the transmission and feedback channel responses.

Similar techniques can also be applied to a single LO system as illustrated in FIG. 5A in which local oscillator 501 generates an LO frequency used for up-converting the transmitted signal in mixer 502 and down-converting the feedback signal in mixer 503. The frequency offset $\Delta\omega$ is added to the frequency ($\omega$) of local oscillator 501. As a result, the signal passing through the transmit channel is $\omega+\Delta\omega$—i.e. the transmit signal varies. On the other hand, the feedback signal remains at the same frequency and is not affected by the frequency shift $\Delta\omega$ after transmitted signal is down-converted in mixer 503. Multiple measurements may be taken as $\Delta\omega$ is varied and then used to solve for the transmit and feedback channel responses.

FIG. 5B illustrates an alternative embodiment of a single LO system 550 in which local oscillator 551 generates an LO frequency used for up-converting the transmitted signal in mixer 552 and down-converting the feedback signal in mixer 553. A frequency offset $\Delta\omega_1$ is added to the transmission channel at digital mixer 554. To compensate for the $\Delta\omega_1$ frequency shift added by digital mixer 554, the frequency generated at local oscillator 551 is set to ($\omega-\Delta\omega_2$) so that the output of system 550 through $H_{TX}$ is centered at $\omega$ (assuming $\Delta\omega_1=\Delta\omega_2$). While the transmit channel frequency remains constant, the frequency of the feedback channel changes with $\Delta\omega_2$ (i.e. $\Delta\omega_{FB}=\Delta\omega_2$). This allows DPD adaptation engine 555 to measure the combined system response over multiple values of $\Delta\omega_2$ and to solve for the transmit and feedback channel responses using these measurements.

In an alternative embodiment, rather than holding one of the channels at a constant frequency, the values of $\Delta\omega_1$ and $\Delta\omega_2$ may be varied independently (i.e. $\Delta\omega_1 \neq \Delta\omega_2$). This would allow both the transmit channel frequency and feedback channel frequencies to be varied at the same time. As a result, the frequency passing through $H_{TX}$ would be centered at $\omega$ and varied by the difference between $\Delta\omega_1$ and $\Delta\omega_2$ (i.e. $\omega+\Delta\omega_1-\Delta\omega_2$). On the other hand, the frequency shift passing through $H_{FB}$ ($\Delta\omega_{FB}$) after down-conversion in mixer 553 would be varied by $\Delta\omega_1$. This is because the $\Delta\omega_2$ frequency shift added in mixer 552 is removed in mixer 553 before the feedback signal enters $H_{FB}$. In the case where $\Delta\omega_1$ is set to 0 or is held constant (e.g. $\Delta\omega_1=0$), but the value of $\Delta\omega_2$ is shifted, then system 550 of FIG. 5B would operate in a similar manner as system 500 of FIG. 5A with the exception that the frequency shift would be subtracted from frequency $\omega$ in system 550 and added to frequency $\omega$ in system 500.

FIG. 6 illustrates an equivalent model 600 of the feedback system simplified using a few further assumptions. To isolate the transmit-feedback system from the DPD, the signals used will be the input to the DAC and the output of the ADC. The effects of the DAC and PA can be merged into $H_{TX}$ 601 and the effects of the ADC merged into $H_{FB}$ 602. In the simplified system of FIG. 6, $H_{TX}$ 601 represents all the effects of the transmit channel, and $H_{FB}$ 602 represents all the effects of the feedback channel. In the dual-LO architecture, the transmit $LO_{TX}$ is held constant and changes in $LO_{FB}$ are represented by $\Delta\omega$ 603.

The overall feedback response is identified by taking multiple measurements of the feedback signal using different frequency offsets ($\Delta\omega$) between the transmit and feedback LOs. By sending a signal through system 600 in FIG. 6 and observing the output, the overall system response for that specific frequency offset can be obtained. $X(\omega)$ and $Z(\omega)$ are the frequency-domain representations of the system input and feedback respectively, and $H_{TX}$ and $H_{FB}$ are the transmit and feedback channel responses of the system. By changing the feedback signal by frequency shift $\Delta\omega$, the following equation is obtained:

$$Z(\omega+\Delta\omega)=X(\omega)\cdot H_{TX}(\omega)\cdot H_{FB}(\omega+\Delta\omega) \qquad \text{Eq. 1}$$

By dividing the inputs signal out of Equation 1, the overall system response or composite transfer function $H(\omega,\Delta\omega)$ is defined as:

$$Z(\omega+\Delta\omega)/X(\omega)=H(\omega,\Delta\omega))=H_{TX}(\omega)\cdot H_{FB}(\omega+\Delta\omega) \qquad \text{Eq. 2}$$

FIG. 7 illustrates the transmit channel transfer function $H_{TX}$ 701 at operating frequency $\omega$ and feedback channel transfer functions $H_{FB}$ 702-704 at offset various frequencies $\omega-\Delta\omega$, $\omega+\Delta\omega$, and $\omega+2\Delta\omega$. Composite transfer function $H(\omega, \Delta\omega)$ as measured at the various offset frequencies will be $H_{TX}(\omega)$ 701 multiplied by one of $H_{FB}(\omega+\Delta\omega)$ 702-704 depending upon the offset frequency used.

In embodiments of the invention, the frequency offset $\Delta\omega$ is selected to correspond to discrete positions in the frequency domain. Acceptable $\Delta\omega$ values correspond to the desired resolution of the channel estimates. Specifically, frequency shifts equal to integer multiples of $2\pi/N$ are desired, where N is the desired number of discrete frequency points between $-\pi$ to $\pi$. Equivalently, N can be thought of as the length of the Discrete Fourier Transform used to initially convert the measurements to the frequency domain. By choosing from these values of $\Delta\omega$, the resulting frequency shifts are guaranteed to correspond to the desired discrete frequencies. Because the frequency shifts are chosen to map to discrete points in the frequency domain, the composite transfer function can be discretized as shown below in Equation 3, where $\Delta n$ is the integer shift corresponding to $\Delta\omega$. When measurements are taken at multiple points in the frequency domain for the same $\Delta\omega$, the measurements will be of the form shown in Equation 4, where N is the measurement length.

$$H[n, \Delta n] = \frac{Y[n+\Delta n]}{X[n]} = H_{TX}[n]\cdot H_{FB}[n+\Delta n] \qquad \text{Eq. 3}$$

$$\begin{bmatrix} H[1, \Delta n] \\ H[2, \Delta n] \\ \vdots \\ H[N, \Delta n] \end{bmatrix} = \begin{bmatrix} H_{TX}[1]\cdot H_{FB}[1+\Delta n] \\ H_{TX}[2]\cdot H_{FB}[2+\Delta n] \\ \vdots \\ H_{TX}[N]\cdot H_{FB}[N+\Delta n] \end{bmatrix} \qquad \text{Eq. 4}$$

The acquired data must be structured in a meaningful way in order to separate $H_{FB}$ and $H_{TX}$ from the composite response. This is accomplished by arranging the measurements into a matrix having a primary coordinate corresponding to the discrete frequency positions of $H_{TX}$ and a secondary coordinate corresponding to discrete frequency positions of $H_{FB}$ at the measurement data points. This equates to placing the measurements along the correct diagonal of the matrix. For simplicity, the matrix may be designated as C and $H_{TX}[n]=a_n$ and $H_{FB}[n]=b_n$. Then, the mapping of H into C is shown in Equation 5 below. This rule is only applied when $n+\Delta n$ is between 1 and N, thereby eliminating data that is corrupted by out-of-band information resulting from the frequency shifts. The structure of the complete C matrix is shown in Equation 6.

$$H[n,\Delta n]=a_n b_{n+\Delta n} \rightarrow C[n,n+\Delta n] \qquad \text{Eq. 5}$$

$$C = \begin{bmatrix} c_{1,1} & c_{1,2} & \cdots & c_{1,N} \\ c_{2,1} & c_{2,2} & & \vdots \\ \vdots & & \ddots & c_{N-1,N} \\ c_{N,1} & \cdots & c_{N,N-1} & c_{N,N} \end{bmatrix} = \begin{bmatrix} a_1 b_1 & a_1 b_2 & \cdots & a_1 b_N \\ a_2 b_1 & a_2 b_2 & & \vdots \\ \vdots & & \ddots & a_{N-1} b_N \\ a_N b_1 & \cdots & a_N b_{N-1} & a_N b_N \end{bmatrix} \qquad \text{Eq. 6}$$

For a fixed offset frequency $\Delta\omega$ in the feedback loop, as the input frequency $\omega$ is varied during measurements, the frequency of the feedback signal stays the same distance ($\Delta\omega$) away from the input signal frequency. As a result, for each integer shift $\Delta n$, matrix C is populated along diagonals $c_{i,i\pm n}$ corresponding to where the measurements have been taken. The other values of the C matrix will be null.

The rationale for restructuring the data into matrix form is that if matrix C was fully populated, then it would be a Rank-1 matrix, as shown in Equation 7. Because of this, vectors a and b can be found from C using the well-known singular value decomposition (SVD), which provides for factorization of a rectangular matrix.

$$C = \begin{bmatrix} a_1 \\ a_2 \\ \vdots \\ a_N \end{bmatrix} \cdot [b_1 \; b_2 \; \cdots \; b_N] = \vec{a}\vec{b}^T \qquad \text{Eq. 7}$$

A brief review of SVD is provided below. Given a matrix A, it can be decomposed as shown in Equation 8, where U and V are unitary matrices and S is a diagonal matrix of the singular values of A organized in descending order. $V^H$ is the conjugate transpose or Hermitian transpose of matrix V.

$$A = USV^H = [\vec{u}_1 \ \vec{u}_2 \ \cdots \ \vec{u}_N] \cdot \begin{bmatrix} \sigma_1 & 0 & \cdots & 0 \\ 0 & \sigma_2 & & \vdots \\ \vdots & & \ddots & 0 \\ 0 & \cdots & 0 & \sigma_N \end{bmatrix} \cdot \begin{bmatrix} \vec{v}_1^H \\ \vec{v}_2^H \\ \vdots \\ \vec{v}_N^H \end{bmatrix} \quad \text{Eq. 8}$$

Matrix A is assumed to be an N-by-N square, and $u_i$ and $v_i$ are the $i^{th}$ column of U and V respectively and $\sigma_i$, is the $i^{th}$ largest singular value. Equation 8 can be simplified to Equation 9 shown below.

$$A = \sum_{i=1}^{N} \sigma_i \vec{u}_i \vec{v}_i^H \quad \text{Eq. 9}$$

Because matrix C is a Rank-1 matrix, its SVD will only have one non-zero singular value in matrix S of Equation 8. Therefore, matrix C can be represented by equation 10.

$$C = \sigma_i \vec{u}_i \vec{v}_i^H \quad \text{Eq. 10}$$

As noted above, for each offset frequency $\Delta\omega$, the values in matrix C are filled along a diagonal. Unmeasured values are set to zero in matrix C. It is not desirable to take all 2N−1 measurements necessary to completely fill matrix C. Instead, embodiments of the invention solve for the full, optimal matrix C from a partially filled matrix C designated as matrix $C^E$, where E is the location where measurement data exists. This algorithm is described below, where $\hat{C}$ is an approximation of C. $T_1(\hat{C})$ is the best Rank-1 approximation of $\hat{C}$ obtained using SVD.

1. Initialize $\hat{C}$ as $T_1(C^E)$
2. Set values of $\hat{C}$ in E equal to those of $C^E$ in E
3. Set $\hat{C}$ equal to $T_1(\hat{C})$
4. Return to step 2 and repeat until convergence This algorithm takes the largest singular $\sigma$ value and the values of the related $\vec{u}$ and $\vec{v}$ parameters, which gives the closest approximation to the complete matrix C, and then refines the estimation by repeating. The algorithm continues until convergence, which may be defined, for example, by an error level determined between sequential estimates of the C matrix.

The best Rank-r approximation from the SVD is defined in Equation 11. The Rank-1 approximation of Equation 11 is equivalent to Equation 10.

$$T_R(C) = \sum_{i=1}^{R} \sigma_i \vec{u}_i \vec{v}_i^H \quad \text{Eq. 11}$$

It should be noted that the method set forth above is just one way of identifying the transmit channel response and feedback channel response within the frequency-shifted composite responses. Embodiments of the invention minimize the cost function given in Equation 12.

$$F(a,b) \equiv \sum_{i,j \in E} \left| C_{i,j}^E - (\vec{a} \cdot \vec{b}^T)_{i,j} \right|^2 \quad \text{Eq. 12}$$

To prevent constructive interference in the noise space, embodiments of the invention use measurements that are not equally spaced. This is accomplished, for example, by perturbing the equally spaced locations based on a uniform, discrete random variable. This results in non-uniform frequency shifts between the points where measurements are taken. An example of uniformly spaced data is illustrated in FIG. 8A and non-uniformly spaced data in $C^E$ is illustrated in FIG. 8B, where the diagonal lines illustrate the location of measurement data for different values of $\Delta\omega$.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method, implemented in a system, said method comprising:
   creating a plurality of feedback signals by shifting a feedback signal frequency by a plurality of first offset values;
   measuring the plurality of feedback signals, the feedback signals modified by a transmission channel response and a feedback channel response; and
   comparing the plurality of created feedback signals to an input signal to identify a composite frequency response of the transmit channel and the feedback channel.

2. The method of claim 1, further comprising:
   generating a control signal for a pre-distortion circuit, the control signal causing the pre-distortion circuit to modify the input signal by an inverse of the transmission channel response.

3. The method of claim 1, wherein the plurality of offset values are selected from integer multiples of $2\pi/N$, where N is a selected number of measurement points between $\pi$ and $-\pi$.

4. The method of claim 3, wherein N corresponds to a length of a Discrete Fourier Transform used to convert feedback signal measurements to the frequency domain.

5. The method of claim 1, further comprising:
   dividing the created feedback signals by the input signal to calculate a plurality of composite system responses, each of the composite system responses comprising the transmission channel response and the feedback channel response.

6. The method of claim 5, further comprising:
   measuring the composite system response at a plurality of operating frequencies and at the plurality of offset values;
   storing the measurements in a matrix; and
   applying singular value decomposition to the matrix of measurements to calculate the transmission channel response and the feedback channel response.

7. The method of claim 6, wherein a primary coordinate of the matrix corresponds to the transmission channel response and a secondary coordinate of the matrix corresponds to the feedback channel response.

8. The method of claim 6, wherein the measurements are taken using a plurality of offset values that are not evenly spaced.

9. A system comprising:
   a pre-distortion circuit coupled between a system input and a transmission channel output;
   a mixer coupled between the transmission channel output and an adaptation circuit in a feedback channel, the mixer offsetting a frequency of a feedback signal away from a frequency of an output signal; and the adaptation circuit coupled to the pre-distortion circuit, the adaptation circuit receiving an input signal from the system input and the feedback signal from the transmission channel output, the adaptation circuit comparing the input signal to the feedback signal at a plurality of feedback signal frequency offsets to generate a plurality of composite responses for the system, the adaptation circuit comparing measurements of the plurality of composite responses to identify a transmit channel response and a feedback channel response, and the adaptation circuit generating an error correction signal for the pre-distortion circuit based upon the transmit channel response.

10. The system of claim 9, further comprising:
a second mixer coupled between the system input and the transmission channel output, the second mixer offsetting the frequency of the output signal; and
the adaptation circuit comparing the input signal to the feedback signal at a plurality of output signal frequency offsets to generate the plurality of composite responses for the system, the adaptation circuit comparing measurements of the plurality of composite responses to identify the transmit channel response and/or the feedback channel response.

11. The system of claim 9, wherein the error correction signal causes the pre-distortion circuit to modify the input signal by an inverse of the transmit channel response.

12. The system of claim 9, wherein the adaptation circuit stores the measurements in a matrix; and applies a singular value decomposition process to the matrix of measurements to calculate the transmission channel response and athe feedback channel response.

13. A method, implemented in a system, said method comprising:
creating a plurality of shifted signals by shifting a digital input signal by a plurality of offset values;
up-converting the shifted signals to create a plurality of transmission signals at a selected output frequency;
down-converting the transmission signals in a feedback circuit to create feedback signals, the feedback signals modified by transmission channel responses at the plurality of offset values and by a feedback channel response; and
comparing the plurality of feedback signals to an input signal to identify a transmission channel response and a feedback channel response.

14. The method of claim 13, further comprising:
generating a control signal for a pre-distortion circuit, the control signal causing the pre-distortion circuit to modify the input signal by an inverse of the transmission channel response.

15. The method of claim 13, wherein the plurality of offset values are selected from integer multiples of $2\pi/N$, where N is a selected number of measurement points between $\pi$ and $-\pi$ corresponding to a length of a Discrete Fourier Transform used to convert feedback signal measurements to the frequency domain.

16. The method of claim 13, further comprising:
dividing the shifted feedback signals by the input signal to calculate a plurality of composite system responses, each of the composite system responses comprising the transmission channel response and the feedback channel response.

17. The method of claim 16, further comprising:
measuring the composite system response at a plurality of operating frequencies and at the plurality of offset values;
storing the measurements in a matrix; and
applying singular value decomposition to the matrix of measurements to calculate the transmission channel response and the feedback channel response.

18. The method of claim 17, wherein a primary coordinate of the matrix corresponds to the transmission channel response and a secondary coordinate of the matrix corresponds to the feedback channel response.

19. The method of claim 17, wherein the measurements are taken using a plurality of offset values that are not evenly spaced.

20. A system comprising:
a digital mixer coupled to a system input receiving an input signal, the digital mixer creating a plurality of shifted input signals having an offset frequency;
a local oscillator coupled to a transmission channel mixer and to a feedback channel mixer, the local oscillator generating a local oscillator signal used in the transmission channel mixer to up-convert the plurality of shifted input signals to a plurality of output signals each at the same output frequency, the local oscillator signal used in the feedback channel mixer to down-convert the plurality of output signals to feedback signals; and
an adaptation circuit receiving the feedback signals and the input signal, the adaptation circuit comparing the input signal to the feedback signals to generate a plurality of composite responses for the system, each of the composite responses corresponding to a different offset frequency, the adaptation circuit identifying a transmit channel response and/or a feedback channel response from the plurality of composite responses.

21. The system of claim 20, further comprising:
a pre-distortion circuit coupled between the system input and the digital mixer, and
wherein the adaptation circuit generates an error correction signal for the pre-distortion circuit based upon the transmit channel response.

22. The system of claim 21, wherein the error correction signal causes the pre-distortion circuit to modify the input signal by an inverse of the transmit channel response.

23. The system of claim 20, wherein a frequency of the local oscillator signal is selected by subtracting the offset frequency from a desired output signal frequency.

24. The system of claim 20, wherein the adaptation circuit measures the composite system response at a plurality of operating frequencies and at the offset frequencies, stores the measurements in a matrix, and applies a singular value decomposition to the matrix of measurements to calculate the transmission channel response.

25. The system of claim 24, wherein a primary coordinate of the matrix corresponds to the transmission channel response and a secondary coordinate of the matrix corresponds to a feedback channel response.

26. The system of claim 24, wherein the measurements are taken using a plurality of offset frequencies that are not evenly spaced.

27. The method of claim 1, further comprising shifting a transmission signal frequency by a plurality of second offset values.

28. The method of claim 1, wherein creating a plurality of feedback signals is done by shifting a transmission signal frequency by a plurality of first offset values instead of shifting a feedback signal frequency by the plurality of first offset values.

* * * * *